Patented Nov. 9, 1948

2,453,142

UNITED STATES PATENT OFFICE 2,453,142

SUGAR-BEARING PRODUCT AND PROCESS OF MAKING

Royal Lee, Milwaukee, Wis., assignor to Lee Foundation for Nutritional Research, Milwaukee, Wis., a corporation of Wisconsin No Drawing. Application May 12, 1944, Serial No. 535,381

4 Claims. (Cl. 99—206)

The present invention relates to sugar-bearing products and to the art of producing the same.

An object of the invention is to provide an improved sugar or sugar-bearing product from a sugary juice, such as sugar cane juice, sorghum juice, maple sap, honey, and carrot juice, the product containing substantially all of the nutrient values of the natural juice.

Another object of the invention is to provide an improved process for effecting expeditious drying of the juice at a relatively low temperature.

A further object is to provide a dry product from an acid sugar-bearing juice, such as orange juice, apple juice, and pineapple juice, and to provide an improved process for drying the juice.

The invention further consists in the several features hereinafter described and claimed.

The juice of sugar cane contains, in addition to sucrose, various nutritionally valuable substances including vitamins, minerals and organic acids, which substances are lost or destroyed in conventional sugar-making processes. The non-crystallizable sugars and a considerable amount of the sucrose are also lost in the by-product of molasses. Previous attempts to dry the natural juice of sugar cane have resulted in the formation of a sticky, gummy, hygroscopic mass and have required a relatively high temperature.

In accordance with the present invention there is admixed or combined with the cane juice a minor proportion of a drying aid or promoter which preferably comprises a pentosan, especially xylan, extracted or derived from one or more of various substances, such as sawdust of maple and other woods, corn cobs, cane fibre, cereal grains, and brain hulls or bran. In some instances, natural cane juice may contain a slight amount of pentosan, but this is insufficient to serve as a drying aid. The amount of added pentosan required varies from about ⅓ to 2% of the weight of the juice solids, although an excess is not ordinarily objectionable. Usually, about 1% of added pentosan is sufficient. The pentosans from maple wood and rye feed or bran have been found particularly suitable. The pentosan extracts from rice bran and wheat material are also usable although more is generally required, namely, about 5% of the weight of the juice solids.

In preparing sugar cane juice for dehydration, the juice is first strained or centrifuged to remove most of the suspended and floating matter. The juice is then preferably concentrated to a water content of 15 or 25%, as by freezing and centrifuging. It is usually desirable to provide at least three successive freezing steps. The ice traps sediment, micro-organisms, and field dirt, and facilitates filtering. The drying aid or promoter is added to or dissolved with juice at this stage, or in some instances before the preliminary concentration.

The treated concentrate is then introduced into a suitable drier, preferably of the vacuum type, where it dries to a cream-colored powder or friable flaky product. The drier is of the spray, roller or belt type, and the temperature therein is such that the product does not exceed about 145° F., so as to avoid destruction of protective enzymes and vitamins. Coagulation of albuminous or protein substances is also avoided. In the case of a drier having a drying roller or belt, the temperature thereof may be somewhat higher, say about 170° F., the refrigerating effect accompanying evaporation avoiding rise of the product temperature above approximately 145° F. The effect of the drying aid is to increase substantially the vapor pressure of the juice, or in other words to reduce the boiling point, thus permitting drying at a relatively low temperature. There is also a greater tendency to rupture and destroy micro-organisms. The drying aid also increases the foam-forming action of the juice, which further helps in drying. The dried pulverulent or flaky product, which is relatively non-hygroscopic, may be used as such or it may be readily converted into granular form by compression, crushing and sifting to the desired size. The dried product may also be reduced to a fine powder in an attrition or hammer mill without danger of gumming up the grinding surfaces of the mill.

The dried product has a mild flavor, sometimes slightly acid, and is readily soluble in water and beverages. The product may also be used in various foodstuffs, such as ice cream, candy and bakery products, and for most purposes when ordinary sugar has been used. The mineral content is relatively high, being usually 3½ to 4%, and consisting principally of potassium and calcium salts.

In some cases the newly dried sugar product may have an unpleasant rum-like odor or flavor. However, the unpleasant volatile material can readily be removed by aeration, as by blowing a warm gas through the product.

Instead of drying the cane juice to a powder, it may be concentrated to a syrupy liquid, as for soda fountain use. The drying aid, however, is still useful in hastening evaporation at a low temperature.

The invention is also applicable to the drying of other sugar-bearing juices, such as sorghum juice, maple sap, carrot juice, orange juice, honey, and milk.

In the case of orange juice, grapefruit juice, or other sugar-bearing juice containing a considerable amount of organic acid, such as citric acid and malic acid, drying of the juice can be further facilitated by treating the juice not only with the pentosan but also with a suitable quantity of a calcium compound of phytic acid, also known as inositol phosphoric acid. The material used may be the natural calcium-magnesium salt known as phytin, or other calcium-bearing phytates, such as those containing a larger proportion of calcium. One of the latter phytates has ascribed to it the formula $C_6H_6O_{24}P_6Ca_5Mg$. The phytate is insoluble or only slightly soluble in water but is readily soluble in the acid fruit juice. A sufficient amount of phytate is added to make an approximately saturated solution, although more or less may be provided in some instances. The amount by weight of the added phytate usually ranges from 60 to 100% of the amount of acid present.

The treated juice is then dried, as in the manner above described, preferably out of contact with oxygen. The juice dries readily without forming a sticky or gummy mass, and the resulting product is non-hygroscopic and is normally in the form of a powder. The dried product retains the natural flavor and aroma of the juice, and also the nutritive, vitamin, and mineral values. In addition, the product contains a substantial amount of calcium, contributed by the phytate, and this calcium is rendered soluble and readily assimilable by its association with the dried acid juice. The phytate also provides phosphorus and magnesium, and in some cases other minerals. The dried product may be readily dissolved in water to reconstitute the treated juice, or it may be added to or incorporated in other foodstuffs. The phytate is practically tasteless and odorless and is stable and relatively non-hygroscopic.

For drying California orange juice, the use of maple pentosan or hemicellulose as the drying aid has been found very effective in producing a dry product which will preserve the natural flavor. For drying Texas and Florida orange juice, this drying aid is also desirable, although pentosans from corn cobs and rye are suitable. The use of a pentosan, and particularly maple pentosan or hemicellulose, as a drying aid for milk has been found to permit drying at a more rapid rate and at a lower temperature than has been previously possible. Milk may be classed as a sugar solution.

The pentosans can be inexpensively made as by aqueous extraction of pentosan-bearing materials, preferably in alkaline solution, the yield being increased by autoclaving. In the case of corn cobs and rye feed, pure water may be used as the extracting agent, and the material is preferably ball-milled to increase the yield. To obtain a tasteless product, it is usually desirable to effect extraction by cold water, followed by autoclaving with more water, the last extraction then yielding a purer product. This method is also desirable with maple sawdust before it is treated with the alkaline solution.

This application constitutes a continuation in part of my copending application for Dehydration method and apparatus, Serial No. 520,760, filed February 2, 1944.

What I claim as new and desire to secure by Letters Patent is:

1. A dry product comprising the solids of an acid sugar-bearing juice combined with added hemicellulose material and a calcium-bearing phytate.

2. A dry product comprising the solids of a sugar-bearing citrus fruit juice combined with added hemicellulose material and a calcium-bearing phytate.

3. A dry product comprising the solids of orange juice combined with added hemicellulose material and a calcium-bearing phytate.

4. A process comprising admixing an acid sugar-bearing food juice with a hemicellulose and a calcium-bearing phytate, and dehydrating the treated juice to form a dry product.

ROYAL LEE.

REFERENCES CITED

The following references are of record in the file of this patent:

UNITED STATES PATENTS

| Number | Name | Date |
| --- | --- | --- |
| 1,204,881 | Kern | Nov. 14, 1916 |
| 1,594,804 | Welch | Aug. 3, 1926 |
| 1,883,150 | Washburn | Oct. 18, 1932 |
| 1,925,441 | Finley | Sept. 5, 1933 |
| 1,977,945 | Jameson et al. | Oct. 23, 1934 |